J. BAIRD.
WHEEL-HUB.
No. 174,103. Patented Feb. 29, 1876.
Fig. 1
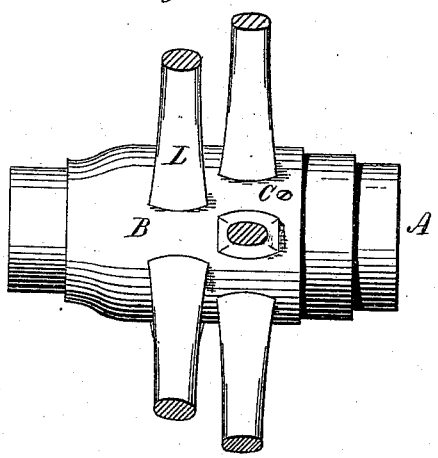
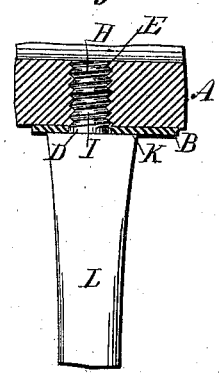
Fig. 2
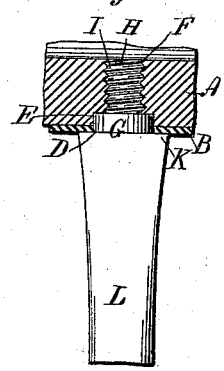
Fig. 3
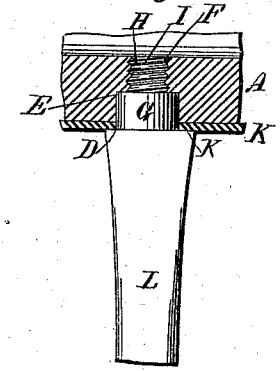
Fig. 4
Witnesses;
Grenville Lewis
H. A. Daniels
Inventor
John Baird
by Geo. B. Morris
Attorney

UNITED STATES PATENT OFFICE.

JOHN BAIRD, OF LEWISVILLE, INDIANA.

IMPROVEMENT IN WHEEL-HUBS.

Specification forming part of Letters Patent No. 174,103, dated February 29, 1876; application filed January 18, 1876.

*To all whom it may concern:*

Be it known that I, JOHN BAIRD, of Lewisville, in the county of Henry and State of Indiana, have invented certain new and useful Improvements in Hubs for the Wheels of Vehicles; and I do hereby declare that the following is a full, clear, and exact description of the construction and operation of the same, reference being had to the accompanying drawing, forming a part of this specification, in which—

Figure 1 is a side view of my improved hub. Fig. 2 is a sectional view of the hub and band and a view of the spoke inserted. Fig. 3 is a sectional view of the hub and band and a view of the spoke, provided with a short shoulder, and Fig. 4 is a view of the same provided with a longer shoulder.

This invention relates to an improvement in hubs for the wheels of vehicles; and it consists of a hub in which spokes, having cylindrical tenons, provided with a shoulder and screw-threads, are inserted into holes having a larger and a smaller diameter, the latter being provided with screw-threads, for the purpose of producing a cheap, durable, and elastic wheel for vehicles.

In the accompanying drawing, similar letters of reference indicate like parts in the invention.

The hub A tapers from one end, in order that the solid metallic band B may be forced upon it and secured by the screws C. The holes D are drilled in the band after it has been forced upon the hub, and the holes E are then bored in the hub A. Smaller holes F are then bored if a cylindrical shoulder, G, is turned upon the tenon, and provided with screw-threads H. The tenon, consisting of the shoulder G and screw I, is then dipped in glue and turned into its seat F F. The tenon may be of one diameter only, as shown in Fig. 2, or it may be of two diameters, and the shoulder G extended not quite to the screw, as shown in Fig. 3; but I prefer that the shoulder G should extend from the rectangular portion K of the spoke L to the screw-threads H, as this gives greater strength to the tenon. The screw-threads prevent the withdrawal of the spokes after the felly has been secured in place.

The only metallic portion about the hub is the band B, and the spokes are inserted into the wood so as to bear against the band, which construction gives greater elasticity to the spokes than if they were held in a metallic seat, thus lessening the danger of breaking them. The band B, even without the screws C, would be held in place by the spokes L.

Having thus described my invention, what I claim as new and useful, and desire to secure by Letters Patent, is—

A hub, in which spokes having cylindrical tenons, provided with shoulders G and screw-threads I, are inserted into holes having the diameter F, provided with screw-threads H and the plain diameter E, as and for the purposes hereinbefore set forth.

JOHN BAIRD.

Witnesses:
 HARRISON OGBORN,
 JOSEPH BAIRD.